(No Model.)
E. FOWBLE.
CULINARY APPARATUS.
No. 365,915. Patented July 5, 1887.
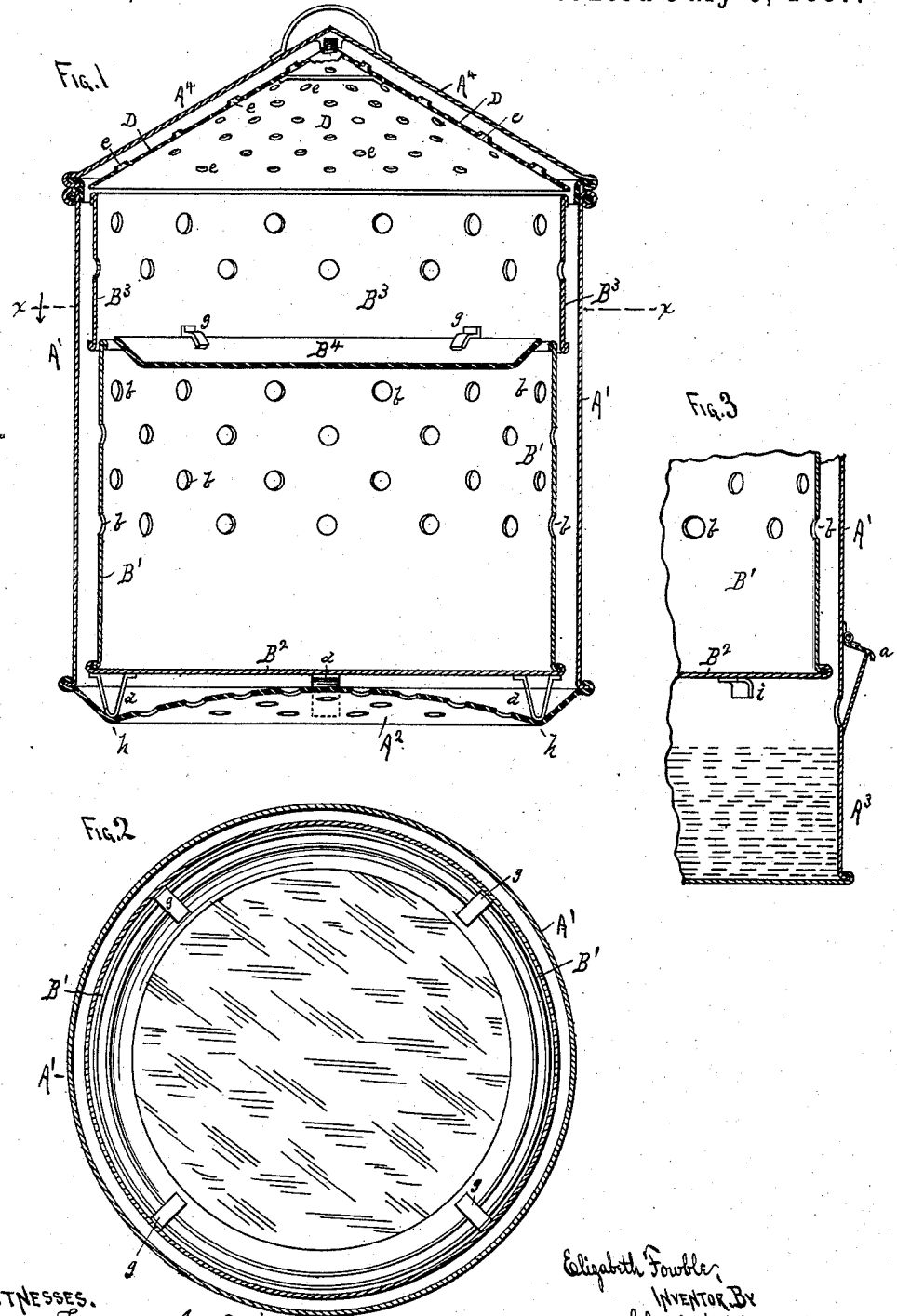

UNITED STATES PATENT OFFICE.

ELIZABETH FOWBLE, OF ST. PAUL, MINNESOTA.

CULINARY APPARATUS.

SPECIFICATION forming part of Letters Patent No. 365,915, dated July 5, 1887.

Application filed February 2, 1887. Serial No. 226,322. (No model.)

*To all whom it may concern:*

Be it known that I, ELIZABETH FOWBLE, a citizen of the United States, residing at St. Paul, in the county of Ramsey and State of Minnesota, have invented certain new and useful Improvements in Culinary Apparatus, of which the following is a specification.

This invention relates to apparatus for culinary purposes; and it consists in the construction and arrangement of parts, as hereinafter shown and described, and specifically pointed out in the claims.

In the drawings, Figure 1 is a sectional elevation of the apparatus complete. Fig. 2 is a plan view on the line $x\ x$ of Fig. 1. Fig. 3 is a sectional detail illustrating a slight modification in the construction.

A' is the outer casing or shell, which may be constructed with a perforated bottom, $A^2$, and adapted to be set over a kettle or other vessel containing water, from which the necessary steam is generated; or the casing may be provided with a water-holding reservoir in its lower part, as shown at $A^3$ in Fig. 3, in which the steam is generated.

The apparatus when constructed as in Fig. 3 is complete in itself, whereas when constructed as in Fig. 1 it will require to be set over a water-holding vessel to render it operative. The two forms of construction, however, are equivalents, and do not change or affect the novel results produced by the apparatus. When constructed as in Fig. 3, a small feed-opening, $a$, will be formed in one side of the water-holding part $A^3$, through which the water may be poured to replace that which has evaporated.

B' represents an inner casing or vessel having a solid or imperforate bottom, $B^2$, the side of the inner vessel being perforated only in its upper part, as shown at $b$, so that none of the steam from the generating part of the apparatus comes in direct contact with the contents of the vessel until it has risen above the imperforate part. The inner vessel, B', is supported by legs $d$ upon the perforated bottom $A^2$, leaving a space between the imperforate bottom of the inner vessel and the perforated bottom of the outer casing, A', for the free circulation of the steam. The inner vessel is smaller than the outer casing, so that the steam is free to circulate around all sides of the inner vessel, but enters only through the perforations $b$ above the food to be cooked, which rests upon the imperforate bottom. By this simple construction the dry steam only comes in contact with the food, thereby preventing the accumulation of moisture upon the food by condensation. The inner vessel being kept at a very high temperature, the condensation is confined to the walls of the outer casing, whence it flows down into the generating-vessel, as before mentioned, and is not deposited in the inner vessel.

The outer casing, A', is provided with the usual conical cover, $A^4$, and attached to the interior of this cover is an auxiliary cover, D, the auxiliary cover being secured a short distance from the outer cover and perforated at short intervals, as shown at $e$, for the passage of the steam as it rises from the generating-vessel. These perforations $e$ are formed by punching the metal upward from the inside, leaving each perforation surrounded by a ridge, so that the condensed steam falling upon the auxiliary cover will not run through the perforations, but will pass around the ridges and drop over the lower edges of the cover, and thence run into the generating-vessel.

The outer edge of the auxiliary cover D projects nearly to the casing A' and outside of the upper edge of the vessel B', so that no drippings therefrom will run into the inner vessel. The auxiliary cover effectually prevents the drippings from the condensed steam falling into the food being cooked, but, acting in conjunction with the casing A', carries off the water of condensation and deposits it into the generating-vessel, as before described.

If desired, a second vessel, $B^3$, of the same general construction as the vessel B', may be suspended in the outer casing, A', upon the inner vessel, B', this secondary vessel being adapted to support separate articles of food, in which they may be cooked with equal facility as in the lower vessel. This secondary vessel will be formed with a shallow dish-shaped bottom, $B^4$, not quite touching the side of the vessel $B^3$, and supported upon the upper edge of the inner vessel by straps $g$ at suitable intervals, so that the steam may freely pass between the parts B' $B^3$ $B^4$. The lower edge of the vessel $B^3$ will extend down below the upper edge of the vessel B', so that all the drippings from the side of the vessel B³ will flow down outside of the vessel B' into the generating-vessel, and will not run into the lower vessel upon the food therein.

The auxiliary cover D will be screwed or otherwise attached removably to the main cover A⁴, so that it can be easily detached for cleansing at the same time and as readily as the other parts of the apparatus.

The perforated bottom B² is shown inclining downwardly and inwardly from its outer rim and curving upward toward the center, so that an inclined channel, $h$, is formed around the outer edge of the perforated bottom, into which the legs $d$ of the vessel B' will rest when the vessel B' is inserted into the casing A', and thus avoid the necessity for adjusting the vessel B' in the casing to insure its proper position equidistant from the outer casing. This is an important advantage, as no bad effects will thereby result from failure to properly adjust the two vessels with relation to each other.

When the construction shown in Fig. 3 is used, the lugs $i$, by which the vessel B' is supported in the casing A', are formed with angular guides tending inward, so as to guide the vessel B' into a central position with relation to the outer casing, and thus insure its proper adjustment at all times.

The form of the bottom B⁴ of the vessel B³ is also an important feature in this connection, as by its inclined outer edge it insures the outer vessel seating itself properly upon the lower vessel, thus avoiding the necessity for adjusting it.

Another important feature of this invention is the manner of forming the auxiliary cover with perforations through its whole extent, thereby insuring the free circulation of the steam through it and preventing condensation upon its under surface.

The formation of the perforations $e$ with the upwardly-projecting rims, as before described, is also an important advantage, as it prevents any of the drippings from falling back again through the perforations, but causes them to flow down over the rim of the cover D.

Having thus described my invention, what I claim as new is—

1. In a culinary apparatus, an outer casing or shell, A', having conical cover A⁴, and in or through which steam is adapted to flow, in combination with inner vessel, B', having imperforate lower part and perforated upper part, and adapted to contain the articles of food to be cooked, and perforated auxiliary cover D, whereby the water of condensation is conducted away from and prevented from forming in said inner vessel, substantially as and for the purpose set forth.

2. In a culinary apparatus, an outer casing, A', having perforated bottom A², with inclined channel $h$, inner vessel, B', having imperforate lower part and perforated upper part, and provided with legs $d$, adapted to be seated in said channel and support said inner vessel centrally upon said perforated bottom and render it self-adjusting thereon, substantially as and for the purpose set forth.

3. In a culinary apparatus, an outer casing, A', having conical cover A⁴, inner vessel, B', having imperforate lower part and perforated upper part and adapted to be set concentrically within said outer casing, and perforated auxiliary cover D, attached removably to said cover A⁴, substantially as and for the purpose set forth.

4. In a culinary apparatus, an outer casing, A', having conical cover A⁴, and in or through which steam is adapted to flow, in combination with inner vessel, B', having imperforate lower part and perforated upper part, secondary vessel B³, having inclined bottom B⁴ and adapted to rest upon said inner vessel with its edges outside of said inner vessel, and auxiliary cover D, with its outer edge beyond the side of said vessels B' B³, substantially as and for the purpose set forth.

5. In a culinary apparatus, an outer casing through which steam is adapted to flow, an inner vessel having imperforate lower part and perforated upper part, in combination with auxiliary cover D, having perforations $e$, with guiding-ridges surrounding them, substantially as and for the purpose set forth.

6. The outer casing having a perforated bottom and close sides and top, through which casing steam circulates, in combination with an inner vessel within said casing, having an imperforate bottom and lower part, a perforated upper part, and a perforated cover, substantially as set forth.

In testimony whereof I have hereunto set my hand in the presence of two subscribing witnesses.

ELIZABETH FOWBLE.

Witnesses:
LOVINA M. RICE,
ZUE McCLARY.